United States Patent
Agrawal et al.

(10) Patent No.: US 10,070,465 B2
(45) Date of Patent: Sep. 4, 2018

(54) APPARATUS FOR RECEPTION AND DETECTION OF RANDOM ACCESS CHANNEL (RACH) DATA

(71) Applicant: FREESCALE SEMICONDUCTOR, INC., Austin, TX (US)

(72) Inventors: Girraj K. Agrawal, Noida (IN); Arvind Kaushik, Ghaziabad (IN); Vincent Martinez, Roques (FR); Amrit P. Singh, Ludhiana (IN)

(73) Assignee: NXP USA, INC., Austin, TX (US)

( * ) Notice: Subject to any disclaimer, the term of this patent is extended or adjusted under 35 U.S.C. 154(b) by 417 days.

(21) Appl. No.: 14/975,831

(22) Filed: Dec. 20, 2015

(65) Prior Publication Data

US 2017/0181192 A1 Jun. 22, 2017

(51) Int. Cl.
H04W 74/08 (2009.01)
H04W 72/12 (2009.01)

(52) U.S. Cl.
CPC ... H04W 74/0833 (2013.01); H04W 72/1284 (2013.01)

(58) Field of Classification Search
CPC .................. H04W 74/0833; H04W 72/1284
USPC ........................................................ 370/328
See application file for complete search history.

(56) References Cited

U.S. PATENT DOCUMENTS

| 8,244,270 B2 | 8/2012 | Chen |
| 8,345,804 B2 | 1/2013 | Song et al. |
| 2006/0222056 A1* | 10/2006 | Yotsumoto ........... H04B 1/7073 375/149 |
| 2010/0020905 A1* | 1/2010 | Mansour ................. H04J 11/00 375/343 |
| 2012/0127949 A1* | 5/2012 | Yoshimoto ........... H04J 11/0053 370/329 |
| 2012/0307734 A1 | 12/2012 | McGowan et al. |
| 2014/0169795 A1* | 6/2014 | Clough ............... G06F 19/3418 398/106 |
| 2015/0215884 A1* | 7/2015 | Horvat .................. G01S 5/0294 370/328 |
| 2015/0278140 A1* | 10/2015 | Motos ................. G06F 13/4022 710/317 |

(Continued)

FOREIGN PATENT DOCUMENTS

WO 2015001369 1/2015

OTHER PUBLICATIONS

Chenggang Lv, Freescale Semiconductor, Inc., QorIQ Qonverge Platform B4860 SoC L1 Partitioning and Key Performance Tips, APF-NET-T0572, http://cache.freescale.com/files/training/doc/dwf/APF-NET-T0572.pdf?fsrch=1&sr=2&pageNum=1.

*Primary Examiner* — Ricky Ngo
*Assistant Examiner* — Ellen Kirillova
(74) *Attorney, Agent, or Firm* — Charles E. Bergere

(57) ABSTRACT

An apparatus for reception and detection of RACH data in an LTE input signal includes a hardware accelerator that has a decimator that filters and down-samples the input signal, a first Fourier transform circuit that transforms the decimated signal from the time domain to the frequency domain, and a second transform circuit that multiplies the resulting signal by a complex Z-C sequence and performs an inverse Fourier transform (iFT) operation to transform the multiplied signal from the frequency domain to the time domain. A DSP performs a delay profile analysis operation on the signal resulting from the iFT operation.

13 Claims, 4 Drawing Sheets

(56) References Cited

U.S. PATENT DOCUMENTS

2016/0365084 A1\* 12/2016 Alderson ........... H03H 17/0223

\* cited by examiner

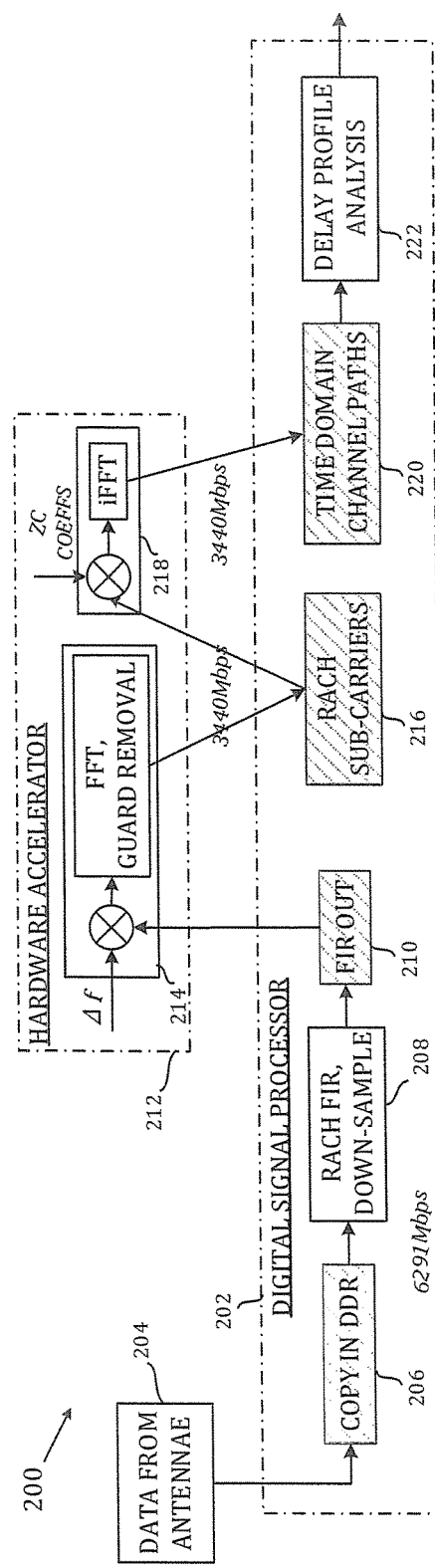
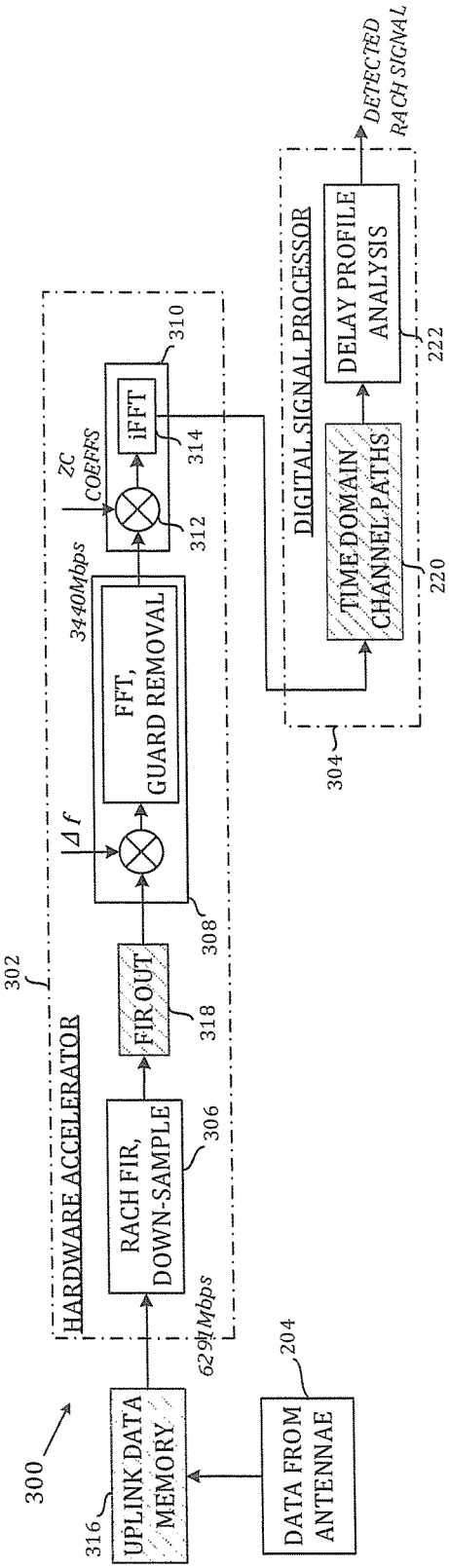

APPARATUS FOR RECEPTION AND DETECTION OF RANDOM ACCESS CHANNEL (RACH) DATA

BACKGROUND

The present invention is directed to wireless communications equipment and, more particularly, to an apparatus for RACH data reception and detection.

"Random access channel" (RACH) for telecommunications is defined in the context of the $3^{rd}$ Generation Partnership Project (3GPP) standards, such as Long Term Evolution (LTE) and LTE Advanced. A physical RACH (PRACH) is used in uplink transmission from a User Equipment (UE) to a base station (NodeB or eNodeB). The PRACH can be used to access the network initially and when the UE loses its uplink synchronization. The PRACH can also be used to request radio resources, to carry control information and reference signals for time offset and adjusting the transmitted power, and to transmit small amounts of data. The PRACH has a role in contention resolution when UEs attempt to access the same NodeB by the same channel simultaneously, leading to collisions.

In LTE and LTE Advanced, PRACH are embedded in the same uplink (UL) transmissions as Physical Uplink Shared Channel (PUSCH) signals that transport Layer 1 UL data, Physical Uplink Control Channel (PUCCH) signals and Sounding Reference Symbols (SRS) that carry some control information. PRACH have specific sub-carrier spacing and specific symbol duration, different from PUSCH, PUCCH and SRS.

Reception and detection of the RACH signals is computationally intensive and involves processing a large quantity of data at high speeds. Conventional RACH reception and detection starts with decimation, which decimation filters and down samples the sampling rate to the sample rate of RACH, for example 1/12 for 20 MHz case. Decimation is typically performed in two steps, first a finite impulse response (FIR) filter operation that filters out the RACH neighbor frequencies for anti-aliasing, and second a down-sampling operation. The signal decimation is followed by Fast Fourier Transform (FFT) and removal of the guard interval. The signal after FFT is then multiplied by the conjugate of the RACH Zadoff-Chu (Z-C) reference sequence, resulting in a frequency domain representation of the fading channel path. An inverse FFT (iFFT) operation is performed on the multiplied signal to transform it from the frequency domain to the time domain. Then a delay profile of the time domain channel paths is computed and analyzed (searched for peaks) to make available the detected RACH signal.

Such intensive computation requires powerful digital signal processors (DSPs) and central processor unit (CPU) cores. However, it is desirable to increase the computational capacity of the processors, not only for more rapid RACH reception and detection, but also to release capacity for other functions.

General purpose DSPs and CPUs execute a sequence of stored instructions (software), and are capable of performing a wide variety of computational tasks. A hardware accelerator is able to speed up specialized tasks that require intensive repetitive calculation, such as FFT and iFFT. A major difference between hardware and software is concurrency of the hardware operation, allowing the hardware to be faster than software for certain specific tasks. In a conventional reception and detection system for LTE compliant PUSCH, RACH and SRS signals, a hardware accelerator is used for some tasks to improve the processing speed.

It would be advantageous to be able to more quickly process RACH reception and detection to achieve even more rapid processing performance.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

FIG. 2 is a schematic block diagram of a conventional apparatus for RACH reception and detection;

FIG. 3 is a schematic block diagram of an apparatus for RACH reception and detection in accordance with an embodiment of the present invention;

DETAILED DESCRIPTION

Figure 1:
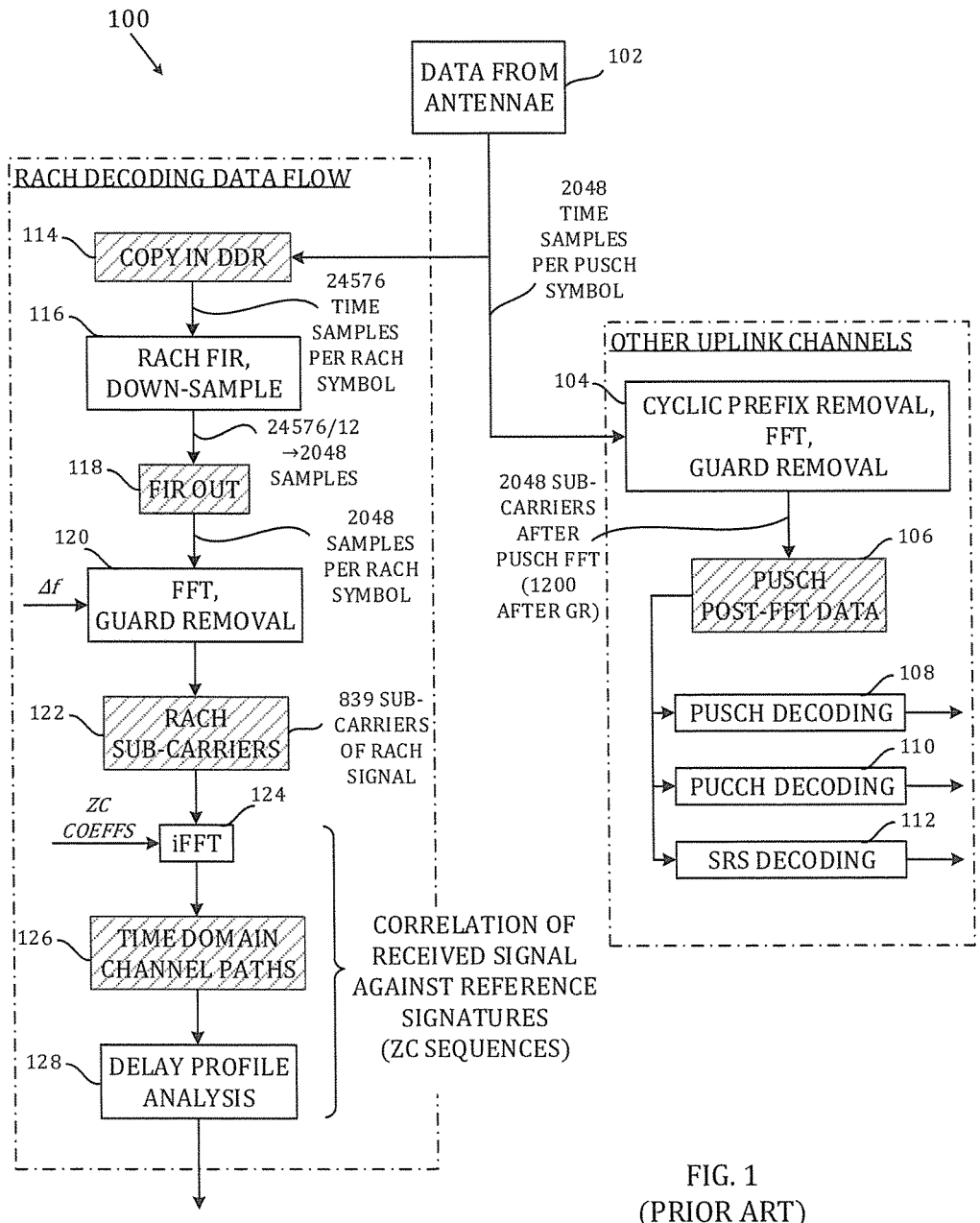
FIG. 1 is a schematic diagram illustrating the flow of data in a RACH reception and detection method in which the present invention can be implemented.

FIG. 1 illustrates data flow in a method 100 of earliest deadline first (EDF) reception and detection in which the present invention can be implemented. The method 100 is applicable to reception and detection of random access channel (RACH) signals that are compliant with the $3^{rd}$ Generation Partnership Project (3GPP) standards, such as Long Term Evolution (LTE) and LTE Advanced and is described below with reference to signals compliant with those standards. Embodiments of the invention are also adaptable to future revisions of these standards and to other standards. RACH reception and detection is used in the LTE and LTE Advanced standards in a base station (NodeB or eNodeB) for uplink transmission from a User Equipment (UE). Embodiments of the invention are also applicable in other equipment for reception and detection of other signals where similar encoding and modulation is used in other circumstances.

In LTE and LTE Advanced, the base station initially receives uplink transmissions of payload data from a UE on antennae at 102 and the Physical Uplink Shared Channel (PUSCH) signals represent 2048 time samples per PUSCH symbol. The PUSCH signals, Physical Uplink Control Channel (PUCCH) signals and Sounding Reference Symbols (SRS) are processed at 104 to remove cyclic prefixes, followed by fast Fourier transform (FFT) and guard interval removal. After FFT, the PUSCH signals represent 1200 sub-carriers per PUSCH symbol, and after guard removal, represent 1200 sub-carriers per PUSCH symbol. This data is stored in a buffer at 106 before decoding the PUSCH, PUCCH and SRS data at 108, 110 and 112.

The RACH signals received are copied at double data rate (DDR) and buffered at 114, representing 24576 time samples per RACH symbol. The method 100 continues at 116 by band-pass or low-pass filtering and down-sampling the sample rate of RACH, for example by 1/12 for the 20 MHz case of RACH format, leaving 2048 time samples per RACH symbol. The filtering is performed by a finite impulse response (FIR) filter that filters out the RACH neighbor frequencies for anti-aliasing. The down-sampling operation reduces the sample rate by an integer factor, in this example keeping only one sample in every 12 samples. The decimated signal is buffered at 118, followed by Fast Fourier Transform (FFT) and removal of guard interval at 120. The signal after FFT has 839 sub-carriers per RACH symbol and is buffered at 122. At 124, the sub-carriers are multiplied by the conjugate of the RACH Zadoff-Chu (Z-C) reference sequence. This results in a frequency domain representation of the fading channel path and reduces cross-correlation between signals transmitted simultaneously. An inverse FFT (iFFT) operation is performed on the resulting signal to transform the signal from the frequency domain to the time domain and the resulting signal is stored at 126. Then at 128 the delay profile of the time domain channel paths is computed and analyzed (search for peaks) to make available the detected RACH signal. The base station then uses the RACH data to signal to, and receive from, the different UEs identification of the channels to use and other transmission and reception parameters.

FIG. 2 illustrates a conventional apparatus 200 for performing the RACH reception and detection method 100. The apparatus 200 comprises a digital signal processor (DSP) 202. The DSP 202 receives the input RACH signals from the antennae at 204 and buffers (114) the signals into a level 2 (L2) cache at 206. The DSP 202 then performs the decimation (filtering and down-sampling) operation 116 in a module 208, representing 6291 Mcps. The decimated data is buffered (118) in the L2 cache of the DSP 202 at 210.

The apparatus 200 also comprises a hardware accelerator 212. The hardware accelerator 212 has a module 214 that performs the FFT and guard interval removal operation 120 on the decimated signal. The RACH sub-carriers after FFT are buffered (122) into an L2 cache at 216. The hardware accelerator 212 has a module 218 that multiplies the RACH sub-carriers by the conjugate of the RACH Z-C reference sequence, and performs the iFFT operation 124 on the sub-carriers after the Z-C multiplication. The resulting time domain channel paths are buffered (126) into an L2 cache at 220. The DSP 202 then has a module 222 that computes and analyzes (128) the delay profiles of the channel paths.

The hardware accelerator 212 is able to speed up the intensive repetitive calculations of the FFT and iFFT operations 120 and 124, releasing capacity in the DSP 202 for other tasks which would otherwise be used for the FFT and iFFT operations. However, even more rapid processing performance is desirable.

FIG. 3 illustrates an apparatus 300 for reception and detection of random access channel (RACH) data in an input signal in accordance with an embodiment of the invention. The apparatus 300 comprises a hardware accelerator 302 and a digital signal processor (DSP) 304. The hardware accelerator 302 has a decimator 306 that filters and downsamples the input signal. A first transformer 308 in the hardware accelerator 302 performs a Fourier transform (FT) operation that transforms the decimated signal from the time domain to the frequency domain. A second transformer 310 in the hardware accelerator 302 multiplies a resulting frequency domain signal by a complex reference sequence ZC COEFFS and performs an inverse Fourier transform (iFT) operation that transforms the multiplied signal from the frequency domain to the time domain. The DSP 304 performs a delay profile analysis operation 222 on a signal resulting from the iFT operation.

The apparatus 300 may be applicable to reception and detection of RACH data in an input signal compliant with a Long Term Evolution (LTE) standard, including LTE-Advanced and future revisions.

The DSP 304 has a lighter front end processing load than the DSP 202. Traffic between the DSP 304 and the hardware accelerator 302 is reduced compared to the conventional apparatus 200. Also, the L2 caches in the DSP 304 are relieved from data, which is processed in the hardware accelerator 302 instead of the DSP 202, and buffer capacity in the DSP 304 is released.

The first transformer 306 in the hardware accelerator 302 may also remove guard intervals from the frequency domain decimated signal.

The second transformer 310 may multiply the frequency domain decimated signal by the complex conjugate of a RACH Zadoff-Chu (Z-C) reference sequence.

The second transformer 310 may include a multiplier 312 that multiplies the frequency domain decimated signal by the complex reference sequence and an iFT module 314 that performs the iFT operation on the multiplied signal.

The apparatus 300 may further comprise a random access memory (RAM) 316 that stores the input signal and a direct memory access (DMA) coupled to the RAM that provides the stored signal to the hardware accelerator 302. Alternatively, the RACH uplink data from the antennae can be buffered in various other locations, such as the core subsystem memory of the DSP 304 and fetched as required.

The hardware accelerator 302 may include an interface 318 that buffers the frequency domain decimated signal and provides the buffered frequency domain signal to the second transformer 310. This configuration gives flexibility in implementing the decimator 306, which can function at an independent rate. For instance, it is possible to schedule the RACH decimator 306 only once for the entire RACH preamble sequence, or at a common pace as the PUSCH FFT 104, processing a PUSCH symbol worth of IQ data (for example 2048+160 IQ samples in the example of LTE20 normal-CP mode for LTE symbol 0), in which case the DMA fetching the RACH data from the RACH decimator 306 and for the PUSCH data FFT can be common (see FIG. 5, described below).

The DSP 304 may include an interface 220 that buffers the time domain signal resulting from the iFT operation and provides the buffered time domain signal to the DSP for the delay profile analysis operation 222.

The hardware accelerator 302 and the DSP 304 may be integrated in a common single semiconductor chip 300.

In one example of the conventional apparatus 200, the traffic between the cache modules 210, 216 and 220 in the DSP 202 and the processing modules 214 and 218 in the hardware accelerator 212 is heavy, representing 3440 Mbps at each transfer of data between the DSP 202 and the hardware accelerator 212. Moreover, the input L2 caches of the DSP 202 have traffic of 6291 Mbps. In the apparatus 300, the traffic to and from the L2 caches of the DSP 304 can be reduced by DMA between the hardware accelerator 212 and the RAM 316 buffering the input signals from the antennae. The hardware accelerator 302 can have its own interface 318 and does not need transfer of data to or from the L2 caches of the DSP 304 until the signal resulting from the iFT operation is transferred to the DSP 304. Data for the different stages of processing in the hardware accelerator 302 can be accessed by DMA, since the payload data is processed within the hardware accelerator 302, does not need to be accessed by a different module or transferred to a different semiconductor chip, and the hardware accelerator 302 and the DSP 304 can be integrated in a common single semiconductor chip. Not only is the data transfer traffic reduced, but the capacity needed for the L2 cache of the DSP 304 is reduced by 27 kB (840 samples*4B*8 antennae) in one example, even taking account of the capacity of the RAM 316 and the interface 318 of the hardware accelerator 302.

In addition, the front end processing load on the relevant cores is reduced from 168 Mcps in the DSP 202 to 20 Mcps in the DSP 304, representing a 14% reduction in this example.

Figure 4:
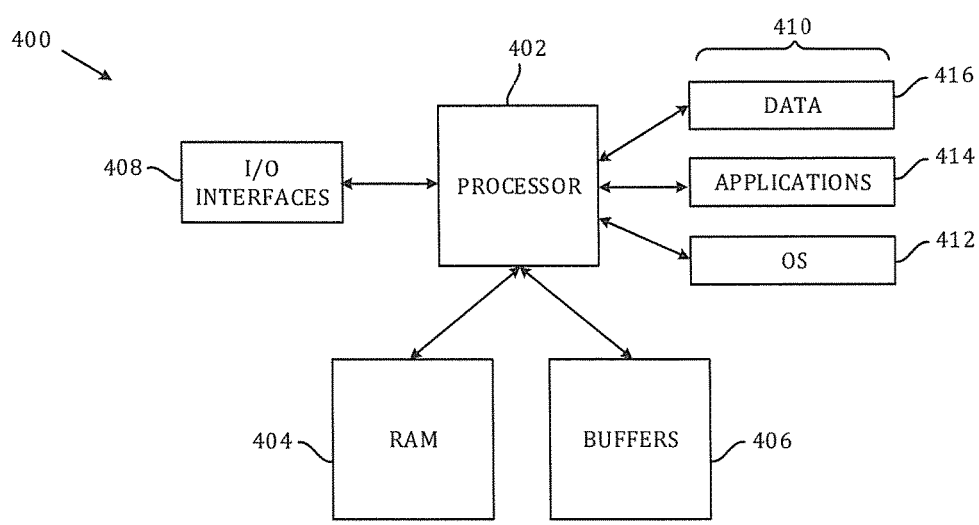
FIG. 4 is a schematic block diagram of a digital signal processor that can be used in the apparatus of FIG. 3.

FIG. 4 is a schematic block diagram of a DSP 400 that can be used in the apparatus 300 described above. The DSP 400 includes a processor 402 coupled to a memory 404 and additional memory or storage 406 coupled to the memory 404. The DSP 400 also includes input/output interfaces 408, and software 410. The software 410 includes operating system software 412, applications programs 414, and data 416. The DSP 400 generally is known in the art except for the software used in reception and detection of RACH data as described above. When software or a program is executing on the processor 402, the processor becomes a "means-for" performing the steps or instructions of the software or application code running on the processor 402. That is, for different instructions and different data associated with the instructions, the internal circuitry of the processor 402 takes on different states due to different register values, and so on, as is known by those of skill in the art. Thus, any means-for structures described herein relate to the processor 402 as it performs the steps of the methods disclosed herein.

Figure 5:
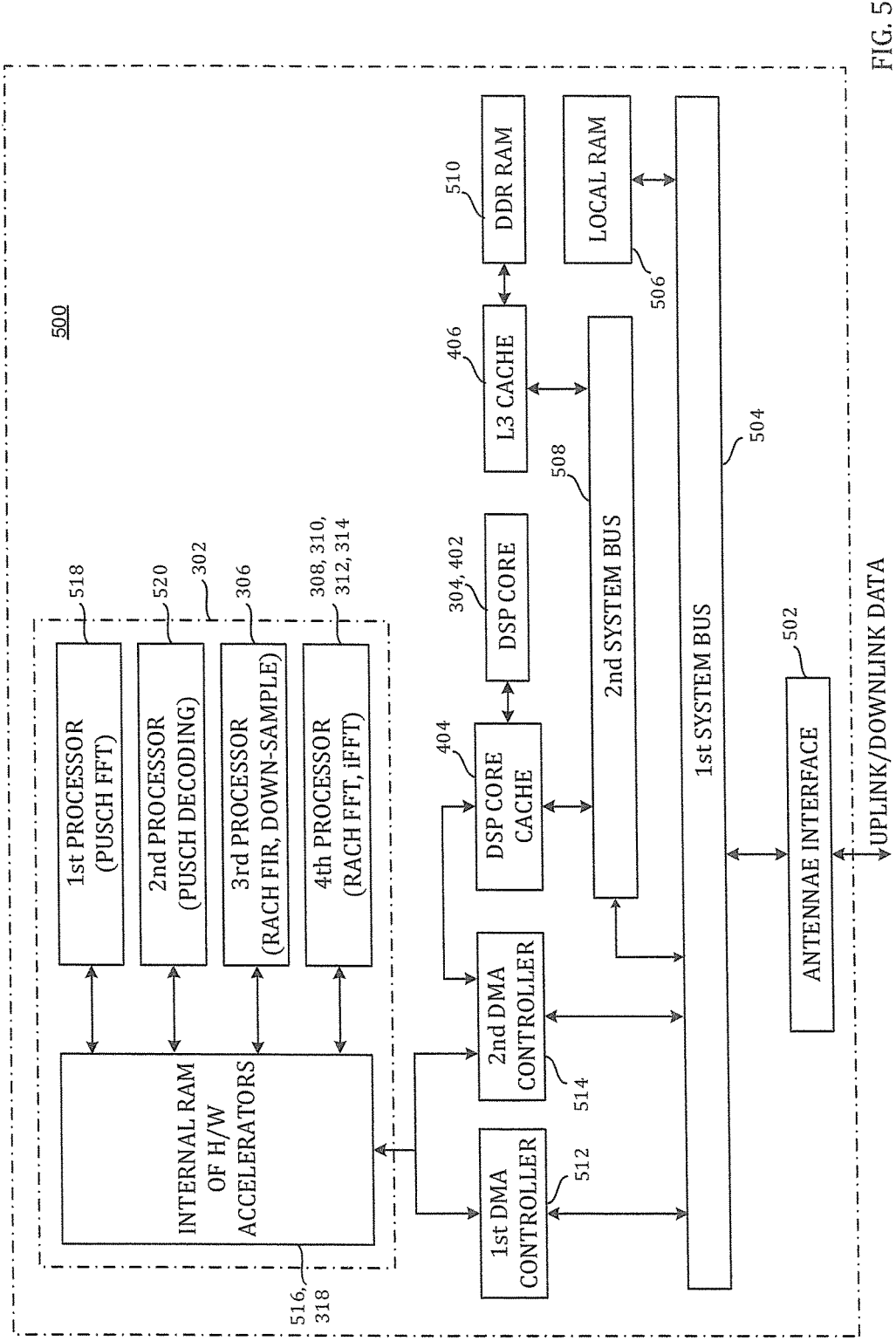
FIG. 5 is a schematic block diagram of an apparatus for reception and detection of 3GPP telecommunication signals in accordance with an embodiment of the present invention.

FIG. 5 illustrates structure of apparatus 500 for reception and detection of 3GPP telecommunication signals, such as LTE and LTE Advanced, in accordance with an embodiment of the invention. The apparatus 500 is used in a base station in this example. The apparatus 500 includes RACH reception and detection apparatus 300 as well as apparatus for processing physical uplink shared channel (PUSCH) data and other uplink and downlink data.

The apparatus has an antennae interface 502 which feeds uplink signals to, and downlink signals from, a first system bus 504, buffering data in a local RAM 506. Uplink and downlink data are exchanged through a second system bus 508 with the DSP core cache 404, the DSP processor 304, 402, and an L3 cache 406 that communicates with higher levels of the system (not shown) through a double data rate (DDR) RAM 510. First and second DMA controllers 512 and 514 exchange data with the first system bus 504, the DSP core cache 404, and the hardware accelerator 302.

The hardware accelerator 302 has four processors and an internal RAM 516, which buffers data for and from the DMA controllers 512 and 514 and the four processors, and may provide the uplink data memory 316. A first processor 518 performs FFT operations 104 on the PUSCH data. A second processor 520 performs decoding operations 108 on the PUSCH data. The third processor is the decimator 306, and the fourth processor performs the FFT and iFFT operations 308, 310, 312, 314 on the RACH data. It will be appreciated that the structure 500 is given by way of example and many variants are possible.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

In the claims, the word 'comprising' or 'having' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An apparatus for reception and detection of random access channel (RACH) data in an input signal, comprising:
   a random access memory (RAM) that stores the input signal;
   a direct memory access (DMA) coupled to the RAM;
   a hardware accelerator that receives the stored signal from the DMA, wherein the hardware accelerator has (i) a decimator that filters and down-samples the input signal, (ii) a first transformer that performs a Fourier transform (FT) operation that transforms the decimated signal from the time domain to the frequency domain, (iii) a second transformer that multiplies a resulting frequency domain signal by a complex reference sequence and performs an inverse Fourier transform (iFT) operation that transforms the multiplied signal from the frequency domain to the time domain, and (iv) an interface that buffers the frequency domain decimated signal and provides the buffered frequency domain signal to the second transformer; and
   a digital signal processor (DSP) that performs a delay profile analysis operation on a signal resulting from the iFT operation,
   wherein the delay profile analysis is used to access a wireless network.

2. The apparatus of claim 1, wherein the first transformer also removes guard intervals from the frequency domain decimated signal.

3. The apparatus of claim 1, wherein the second transformer multiplies the frequency domain decimated signal by the complex conjugate of a RACH Zadoff-Chu (Z-C) reference sequence.

4. The apparatus of claim 1, wherein the second transformer includes:
   a multiplier that multiplies the frequency domain decimated signal by the complex reference sequence; and
   an iFT module that performs the iFT operation on the multiplied signal.

5. The apparatus of claim 1, wherein the DSP includes an interface that buffers the time domain signal resulting from the iFT operation, wherein the buffered time domain signal is used by the DSP for the delay profile analysis operation.

6. The apparatus of claim 1, wherein the hardware accelerator and the DSP are integrated in a common single semiconductor chip.

7. An apparatus for reception and detection of random access channel (RACH) data in an input signal, comprising:
   a memory that stores the input signal;
   a direct memory access (DMA), coupled to the memory, that accesses the stored signal;
   a hardware accelerator coupled to the DMA for receiving the stored input signal, wherein the hardware accelerator includes:
   a decimator that performs a finite impulse response (FIR) filter and down-sample operation on the stored input signal,
   a first transformer that performs a Fourier transform (FT) operation to transform the decimated signal from the time domain to the frequency domain,
   an interface that buffers the frequency domain decimated signal, and
   a second transformer that multiplies the buffered decimated frequency domain signal by a complex reference sequence and performs an inverse Fourier transform (iFT) operation to transform the multiplied signal from the frequency domain to the time domain; and
   a digital signal processor (DSP) that performs delay profile analysis on the time domain signal resulting from the iFT operation, wherein the delay profile analysis is used to perform at least one of: (i) access a wireless network when the apparatus loses synchronization to the network, (ii) request radio resources, (iii) carry control information and reference signals for time offset and adjusting transmit power, (iv) transmit small amounts of data over the network, and (v) facilitate contention resolution when more than one apparatus attempt to access a same node simultaneously.

8. The apparatus of claim 7, wherein the first transformer also removes guard intervals from the frequency domain filtered signal.

9. The apparatus of claim 7, wherein the second transformer multiplies the frequency domain decimated signal by the complex conjugate of a RACH Zadoff-Chu (Z-C) reference sequence.

10. The apparatus of claim 7, wherein the second transformer includes:
    a multiplier that multiplies the frequency domain decimated signal by the complex reference sequence; and
    an iFT module that performs the iFT operation on the multiplied signal.

11. The apparatus of claim 7, wherein the DSP includes an interface that buffers the time domain signal resulting from the iFT operation and provides the buffered time domain signal to the DSP for the delay profile analysis operation.

12. The apparatus of claim 7, wherein the hardware accelerator and the DSP are integrated in a common single semiconductor chip.

13. The apparatus of claim 7, wherein:
    the input signal has a physical uplink shared channel (PUSCH),
    the hardware accelerator performs a fast Fourier transform (FFT) operation on PUSCH data at a common rate for operation of the decimator and the PUSCH FFT, and
    the DMA fetches the RACH data from the RACH decimator for the PUSCH data FFT.

* * * * *